United States Patent
Kalama et al.

(10) Patent No.: US 7,663,488 B2
(45) Date of Patent: Feb. 16, 2010

(54) SYSTEM AND METHOD OF VIRTUALLY PACKAGING MULTIMEDIA

(75) Inventors: Asa Kalama, Los Angeles, CA (US);
Holger Irmler, Studio City, CA (US);
Frank Mezzatesta, Glendale, CA (US);
Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 296 days.

(21) Appl. No.: 11/768,085

(22) Filed: Jun. 25, 2007

(65) Prior Publication Data

US 2008/0316031 A1    Dec. 25, 2008

(51) Int. Cl.
*G08B 13/14* (2006.01)

(52) U.S. Cl. ............ 340/572.1; 340/539.1; 340/825.69; 340/826.72; 340/10.1; 340/10.3

(58) Field of Classification Search ............... 340/572.1, 340/572.3, 573.4, 539.1, 825.69, 825.72, 340/10.1, 10.3, 5.91, 572.4, 5.61; 235/383, 235/385, 462.01, 462.15; 700/94; 705/24, 705/27
See application file for complete search history.

(56) References Cited

U.S. PATENT DOCUMENTS

| | | | |
|---|---|---|---|
| 4,831,610 A | 5/1989 | Hoda et al. | |
| 5,319,454 A | 6/1994 | Schutte | |
| 5,640,193 A | 6/1997 | Wellner | |
| 5,971,277 A | 10/1999 | Cragun et al. | |
| 6,629,133 B1 | 9/2003 | Philyaw et al. | |
| 6,717,507 B1 | 4/2004 | Bayley et al. | |
| 6,866,196 B1 | 3/2005 | Rathus et al. | |
| 6,946,970 B2 | 9/2005 | Stefanik et al. | |
| 7,039,615 B1 | 5/2006 | Gajjala et al. | |
| 7,044,395 B1 | 5/2006 | Davis et al. | |
| 7,066,781 B2 | 6/2006 | Weston | |
| 7,143,947 B2 | 12/2006 | Rathus et al. | |
| 7,373,109 B2 * | 5/2008 | Pohja et al. | 455/41.2 |
| 7,376,585 B2 * | 5/2008 | Haller | 705/21 |
| 2002/0107591 A1 | 8/2002 | Gabai et al. | |
| 2009/0115573 A1 * | 5/2009 | Naressi et al. | 340/10.1 |

FOREIGN PATENT DOCUMENTS

WO    WO 2006/027723 A1    3/2006

OTHER PUBLICATIONS

International Search Report and Written Opinion for PCT Application No. PCT/US08/61917, dated Dec. 5, 2008, 10 pages.

* cited by examiner

*Primary Examiner*—Hung T. Nguyen
(74) *Attorney, Agent, or Firm*—Marsh Fischmann & Breyfogle LLP; Kent A. Lembke

(57) ABSTRACT

Embodiments include systems and methods of accessing multimedia content. One embodiment includes a system for accessing multimedia data. The system includes a tangible object comprising at least one proximity device embedded within the tangible object. The tangible object is configured to provide identification information of the tangible object. The system further includes a reader configured to wirelessly detect the tangible object based upon the proximity device and receive the identification information. The system further includes a device configured to receive a signal from the reader in response to detecting the tangible object and configured to access multimedia data based upon the provided identification information.

38 Claims, 4 Drawing Sheets

SYSTEM AND METHOD OF VIRTUALLY PACKAGING MULTIMEDIA

BACKGROUND OF THE INVENTION

1. Field of the Invention

The present invention relates to systems and methods of providing access to multimedia content.

2. Description of the Related Technology

A variety of methods have been developed for electronic distribution of multimedia content, such as motion pictures, musical recordings, animation, or educational information. For example, videos and music may be downloaded over the Internet and/or accessed via "video-on-demand" services from a cable head-end. Accordingly, a need exists for systems and methods of accessing such media.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved and more convenient access to multimedia content.

One embodiment includes a system for accessing multimedia data. The system includes a tangible object comprising at least one proximity device embedded within the tangible object. The tangible object is configured to provide identification information of the tangible object. The system further includes a reader configured to wirelessly detect the tangible object based upon the proximity device and receive the identification information. The system further includes a device configured to receive a signal from the reader in response to detecting the tangible object and configured to access multimedia data based upon the provided identification information.

Another embodiment includes a method of accessing multimedia data. The method includes detecting proximity to a tangible object, receiving identification information of the tangible object, and accessing multimedia data based upon the provided identification information and in response to detecting proximity of the tangible object.

One embodiment includes a method of accessing multimedia data. The method includes detecting proximity to a tangible object, receiving identification information from the tangible object, and receiving identification information of a media access device. The method further includes identifying multimedia data associated with the identification information of the tangible object. The method further includes determining whether the device is authorized to receive the identified multimedia data. The method further includes providing the multimedia data to the device based on the determining.

One embodiment includes a system for controlling access to multimedia data. The system includes at least one data store configured to store data associating identification information of a tangible object with information indicative of multimedia content. The store is further configured to store data associating the tangible object with at least one media access device. The system further includes a processor configured to receive data indicative of detecting proximity to a tangible object, receive identification information from the tangible object, receive identification information of a media access device, identify multimedia data associated with the tangible object, determine whether the device is authorized to receive the identified multimedia data, and provide the multimedia data to the device based on the determination.

DETAILED DESCRIPTION OF CERTAIN EMBODIMENTS

Figure 1:
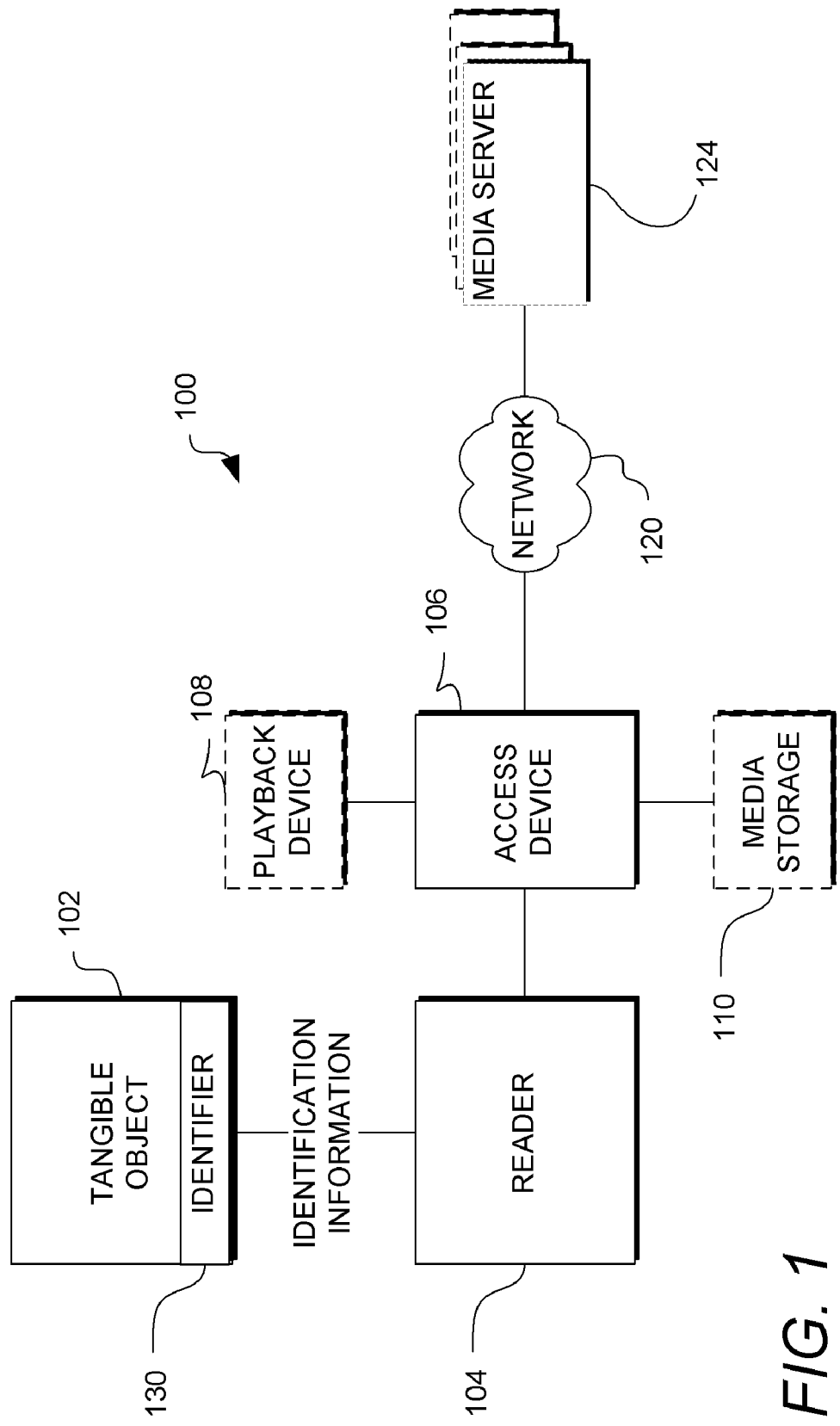
FIG. 1 is a block diagram illustrating one embodiment of a system for accessing multimedia data.

The following detailed description is directed to certain specific embodiments of the invention. However, the invention can be embodied in a multitude of different ways as defined and covered by the claims. In this description, reference is made to the drawings wherein like parts are designated with like numerals throughout.

Video-on-demand services, video and music download services, digital video recorders, home audio/video/multimedia servers, home theatre computers, electronic picture frames and other multimedia play back devices can be configured to access and playback multimedia content such as photographs, motion pictures, musical recordings, animation, news, or educational information. Such multimedia content may include recorded media or live media (such as musical or other performances or news and information content).

Such devices and services allow a consumer to access multimedia content without using any physical or tangible medium associated with that multimedia content. While having many desirable aspects, including electronic searchability and reduced inventory and distribution costs, such virtual multimedia content's lack of a tangible medium or packaging can make it difficult for consumer's who maintain a collection of such content to track their collection. Moreover, electronic program guides and other on-screen user interfaces to access virtual multimedia content are often cumbersome for consumers to use because the interfaces tend to vary between service and device provider, and the interfaces may be difficult to browse due to the relatively small display space of an electronic device or a video monitor. Moreover, less technically savvy consumers, for example, small children, may have difficulty with even the easiest to use electronic interface without assistance.

Further, virtual media content is typically associated with a particular consumer account or electronic device. Thus, when devices are replaced or accounts change due to the consumer moving, marrying, or even changing credit cards, the consumer may lose access to their prior virtual content purchases (at least without resort to an inconvenient or cumbersome re-registration or authorization process). A related issue is that, unlike, for example, a DVD, consumers of purely virtual multimedia content generally have no convenient way to play their own media at the home of friends or family, nor can purely virtual multimedia content be easily given as a gift. Moreover, purely virtual multimedia content does not provide consumers any tangible indicia of ownership or any physical premiums associated with the purchase of content. Purely virtual multimedia content also may fail to provide content providers with an adequate retail sales channel and encourage lower margin rental (or pay-per-view purchase) instead of higher margin purchase.

Accordingly, one embodiment includes a system and method of accessing multimedia content using a tangible object that acts as a virtual package. A tangible object, such as an object similar to an existing DVD or CD container, a toy, a food or drink container, or any other suitable object, includes an identifier. Such an identifier can be embedded inside the object to minimize damage to the identifier and to reduce opportunities for tampering with the identifier. The identifier may include an electronic resonance based device or a radio frequency identifier (RFID) tag or any other suitable device for providing identification information. A reader is configured to determine the proximity of the tangible object and receive the identification information. An access device receives the identification information from the reader and identifies and accesses the multimedia content associated with the identifier.

For example, in one embodiment, multimedia content such as motion pictures or other videos are provided through a download to an access device. The access device is in communication with a reader. In one example of the system, the reader includes a substantially planar surface onto which virtual packages may be placed. When a virtual package, e.g., a container or other tangible object identified with a corresponding video, is positioned on the surface of the reader, the reader reads the identification information of the virtual package and communicates that information to the access device. The access device downloads the corresponding video (or accesses a copy from a local storage). In one embodiment, the access device immediately begins playback of the video. The access device may be configured to communicate with audio/video playback equipment (e.g., a television or video monitor and/or audio receiver) to appropriately adjust inputs to play the video.

FIG. 1 is a block diagram illustrating one embodiment of a system 100 for accessing multimedia data. The system 100 includes a tangible object 102 that provides identification information (of the tangible object 102) to a reader 104. The reader 104 determines the presence of the tangible object 102, receives the identification information, and provides the identification information to an access device 106. The access device 106 identifies multimedia content associated with the identification information of the tangible object 102 and provides the multimedia content (or information for accessing the multimedia content) to a playback device 108. For example, in one embodiment, the multimedia content is obtained from a local storage 110 which may be in communication with the access device 106 and/or the playback device 108. The access device 106 may also communicate with one or more media servers 124 via a network 120 as part of identifying the multimedia content associated with the tangible object 102 and/or to access or download the multimedia content.

The tangible object 102 may comprise a box or other object similar to a DVD or CD container. In one embodiment, the container may be configured to store a program or other descriptive information related to multimedia content associated with the tangible object 102. The tangible object 102 may comprise a toy. For example, the tangible object 102 may comprise a toy having a form or decoration representative of, or indicative of, a character, scene, or other story element drawn from multimedia content associated with the tangible object 102. In one embodiment, the tangible object 102 may be configured to receive a label indicative of particular multimedia content. The label is then affixed to the tangible object when the object 102 is associated with the corresponding multimedia content.

The tangible object 102 comprises an identifier 130 configured to provide identification information of the tangible object 102. In one embodiment, the identifier 130 uniquely identifies the tangible object 102. The identifier 130 may comprise a wireless communication device that is embedded within the tangible object 102. For example, the identifier 130 may comprise an electromagnetic resonance based device. In other embodiments, the identifier 130 may comprise an active or passive radio frequency identifier (RFID) tag. In another embodiment, the identifier 130 may comprise a Bluetooth communication device, or any other suitable short range communication device.

The identifier 130 may be used in conjunction with a suitable reader 104 to determine the presence, orientation, and relative position of the tangible object 102, or of portions of the tangible object 102, with respect to the reader 104. In addition, the tangible object 102 may comprise one or more regions or portions of the object 102 that may be configured to act as controls to provide additional information to the reader 104. The access device 106 may be configured to control access and playback of multimedia content based on the position, orientation, and other control information. In such embodiments, the tangible object 102 may augment or replace a remote control or built-in controls of the access device 106 and/or the playback device 108.

In one embodiment, the positional, orientation, and control information of the tangible object 102 may also be used to control audio tracks, access to special features may be controlled based on the position or orientation of the object to the reader.

In one embodiment, the tangible object 102 may comprise a toy in which movement or positioning of portions of the toy provides positional, orientation, or other such control signals to the reader 104. For example, the tangible object 102 may comprise a doll that provides positional, orientation, or other such control signals to the reader 104 depending on the position of the arms, legs, etc. of the doll. In one embodiment, such control signals may be generated by configuring an electromagnetic resonance device within the doll to provide different signals depending on the positioning. In one embodiment, a Bluetooth or other controller may generate different control signals based on the relative position of parts of the doll. In one embodiment, the toy may speak, move, or otherwise react, and in particular, may react synchronously with events in the movie. In one embodiment, the media comprises a game that is controlled by movement or other manipulation of the toy.

In some embodiments the tangible object 102 comprises a food, drink, or other container or premium which is associated with multimedia content that may include advertisements, purchase premiums, etc. that are retrieved and played when the object is placed on the media player. In one such embodiment, the tangible object 102 comprises a contest entry in which the purchase receives a chance of winning a copy of the multimedia content that is accessed via the tangible object. In another embodiment, the multimedia content associated with the tangible object 102 provides the results of a contest. In one embodiment, the tangible object 102 comprises a food or drink container, a toy, etc. that is produced in a series such that a different piece of media is played when each tangible object 102 is placed on the reader 102 (e.g., a series of seven dwarf dolls plays a clip associated with the particular dwarf).

The reader 104 may comprise any suitable device for receiving identification information of the tangible object 102. For example, the reader 104 may comprise one or more of an electronic resonance based receiver that receives identification information from the identifier 130 and information about the position and orientation of the tangible object 102, a radio frequency identifier (RFID) reader, a Bluetooth transceiver, or any other suitable device for receiving identification information from the identifier 130.

In one embodiment, the tangible object 102 is associated with the multimedia content prior to distribution and sale. For example, the identification information of each tangible object is stored in a database of the media server 124 in association with selected multimedia content. In other embodiments, the tangible object 102 is distributed as a "blank" that is not associated with any content until a consumer associates multimedia content with the "blank," e.g., at time of purchase of the content. For example, in one such embodiment, a user purchase purchases or otherwise identifies multimedia content via the access device 106. The user further selects a "blank" object 102 and places it in proximity to the reader 104. The reader 104 provides the detected identification information of the "blank" object 102 to the access device 106, which then associates the identified multimedia content with the "blank" object 102. In one such embodiment, the access device 106 provides a printable label similar to those found on DVDs or CDs that identify the content. The labels can be printed by the consumer and attached to the tangible object 102. In such embodiments, the multimedia content may be stored on a playback device such as a personal video recorder (PVR) or other playback device 108 such as a home theatre personal computer, may be stored on the media storage 110, or may be stored on the media server 124.

In a similar embodiment, the consumer purchases or otherwise obtains the multimedia content at a store or kiosk that is stocked with "blank" objects 102. The store or kiosk (e.g., an employee or a self serve interface) reads the blank and associates it with content identified by the user. A label (which may be stocked for different content or printed at time of association) may also be provided for affixing to the object 102 to identify the associated content of the "blank."

The access device 106 is configured to receive the identification information from the reader 104. The access device 106 identifies multimedia content that has been associated with the identification information of the tangible object 102. The access device 106 may identify the content using a database or identification server in communication with the access device 106, e.g., via the network 120. In one embodiment, the access device 106 comprises a database that associates identification information of tangible objects 102 with particular multimedia content. The database may further comprise information indicative of how to access that content. For example, the database may identify a particular playback device 108 (e.g., a PVR) as storing the particular media content. In another embodiment, the access device 106 requests identification of the multimedia content associated with a particular tangible object 102 from the media server 124. The media server 124 may also provide information indicative of how to access the content. In one embodiment, the media server 124 provides the identified multimedia content to the access device 106 or directly to the playback device 108 via the network.

In one embodiment, the access device 106 comprises an infrared or radio frequency remote control device that configures the playback device 108 to access and control playback of the selected multimedia content. In addition, the access device 106 may use such a remote control to control the playback of the multimedia content based on control inputs and/or the position and orientation of the tangible object 102.

The playback device 108 comprises an audio and/or video playback device such as a television or video monitor along with hardware and software for accessing and playing multimedia content associated with tangible objects 102 from the access device 106, the local media storage 110, or the media server 124. For example, the playback device 108 may comprise an MPEG player, an MP3 player, or any other suitable type of multimedia content player. The multimedia content may also be protected by digital rights management mechanisms supported by the playback device 108.

The media storage 110 optionally provides storage of multimedia content to the access device 106 or the playback device 108. In one embodiment, one or both of access device 106 or the playback device 108 may comprise the media storage 110.

The network 120 may include one or more of the Internet, a cable head-end or other video on demand service, or any other suitable network. The access device 106 may communicate with the network 120 via any suitable network interface including, for example, Ethernet, a wireless (WiFi) Ethernet, and/or Bluetooth. The network interface may further include a DSL or cable modem connection.

The media server 124 may comprise a video-on-demand system, a music or video download system, a photograph or video storage system, or any other database of multimedia content. In one embodiment, the media server 124 comprises a database associating identification information of the tangible object 102 with particular multimedia content.

The media server 124 may also provide rights management functions. For example, the media server 124 may limit access of the multimedia content associated with a particular tangible object to a particular access device 106 or playback device 108, to a specified number of such devices, or to a specified number of such devices within a specified period. Thus, depending on preferences of the consumer, how much the consumer paid, and preferences of the content owner, particular media content may be accessed on only the consumer's own equipment, at a specified number of other locations (such as friend's homes, hotels, etc.) or accessible without restriction. In addition, the media server 124 may include a database of stolen, pirated, or otherwise revoked identification information and prevent or limit access to particular identification information. The media server 124 may protect provided multimedia content with suitable digital rights management schemes. In one embodiment, the identification information of the tangible object 102 may comprise encryption keys or other information used in connection with digital rights management.

It is to be recognized that functions of various components of the system 100 described herein are merely illustrative. In particular, various functions described with reference to one or more components may be combined into a single component. For example, in one embodiment, the access device 106 comprises the reader 104. In one embodiment, the playback device 108 comprises the access device 106 and the reader 104. Other embodiments may include any other suitable distribution of the functions described herein.

Figure 2:
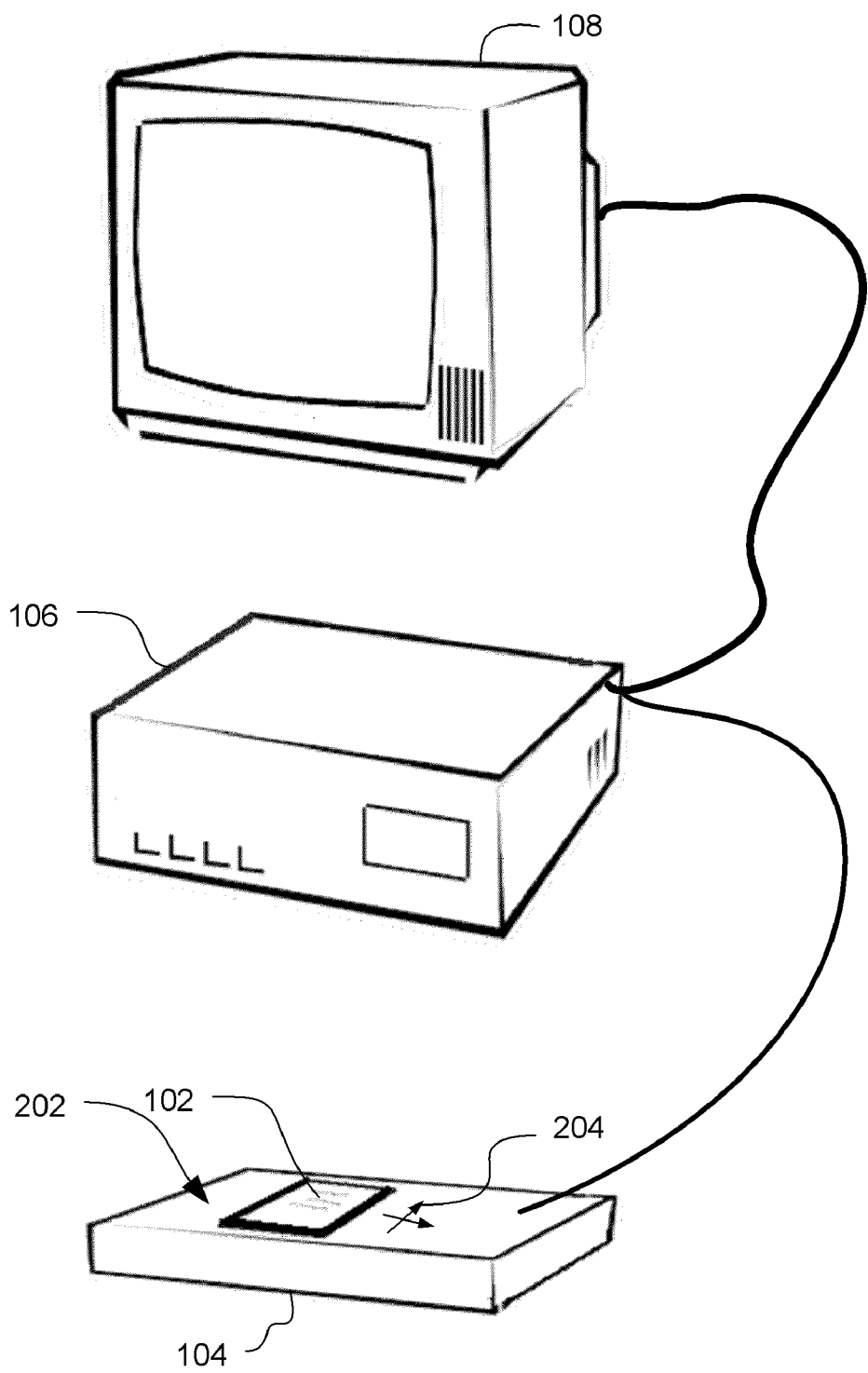
FIG. 2 is a schematic illustration of a portion of one example of a system such as illustrated in FIG. 1.

FIG. 2 is a schematic illustration of a portion of one example of the system 100. In the illustrated example, the reader 104 comprises a surface 202. When the tangible object 102 is placed on or near the surface 202, the reader 104 determines that the tangible object is present and receives the identification information of the tangible object 102. In one embodiment, the reader 104 also receives information indicative of the relative position or orientation of the tangible object 102 with reference to the reader 104 for example, with reference to the surface 202 of the reader 104. The reader 104 may comprise indicia 204 or other instructions that provide a reference for relative positions of the tangible object 102 and/or text or pictorial instructions for the user to position the tangible object 102 relative to the reader 104. The reader 104 provides the identification information and, optionally, any orientation information to the access device 106. The access device 106 identifies the associated multimedia content and accesses the content or provides the playback device 108 with instructions for accessing the multimedia content.

In one embodiment, the tangible object 102 comprises a container similar in size and/or shape to a DVD container. Each tangible object 102 is associated with a video or other multimedia content. Consumers purchase the tangible objects 102 to purchase rights to unlimited or limited playback of the associated multimedia content. When the consumer places the tangible object 102 in proximity to the reader 104, the identification information of the tangible object 102 is provided to the access device 106. The access device 106 communicates with the media server 124 to identify the multimedia content associated with the tangible object 102. The media server 124 may also authenticate the tangible object 102 using any suitable rights management scheme. The access device 106 then downloads the associated multimedia content from the media server 124 (or accesses it from the media storage 110). The access device 106 then provides the multimedia content whenever the associated tangible object is placed in proximity to the reader 104. In one embodiment, the access device 106 may control playback based on position and orientation of the tangible object 102 with respect to the reader 104. For example, the object 102 may have two sides, a first side associated with playback of a pan-and-scan format version of a motion picture and the second side associated with playback of an original aspect ratio version of the same motion picture. The access device 106 selects playback based on the side that is placed closest to (e.g., which side is face up on) the reader 104.

In one embodiment, the multimedia content may also be personal content created or maintained by the consumer. Such multimedia content may be stored on the media storage 110 and/or the media server 124. For example, photos or home movies may be provided over the Internet (e.g., the media server 124 may comprise a website to which the photos or movies are uploaded by the user) or stored on the media storage 110. The personal multimedia content is associated with a "blank" tangible object 102 as discussed above. In one embodiment, the tangible object 102 may comprise an object such as keychain that is associated with a collection of content selected by, or identified with, its owner.

In one embodiment, the playback device 108 comprises an electronic picture frame that is in communication with, or which integrates, the reader 104 and access device 106. When the associated tangible object is placed in proximity to the picture frame, the associated photos or videos are accessed via the picture frame without need for a complex and cumbersome user interface for the user. For example, in one embodiment, vacation photos may be uploaded and associated with a tagged postcard, which is mailed to a recipient having the appropriate picture frame playback device 108. When recipient receives the postcard, the recipient simply places it on or near the frame to access and view the content.

Figure 3:
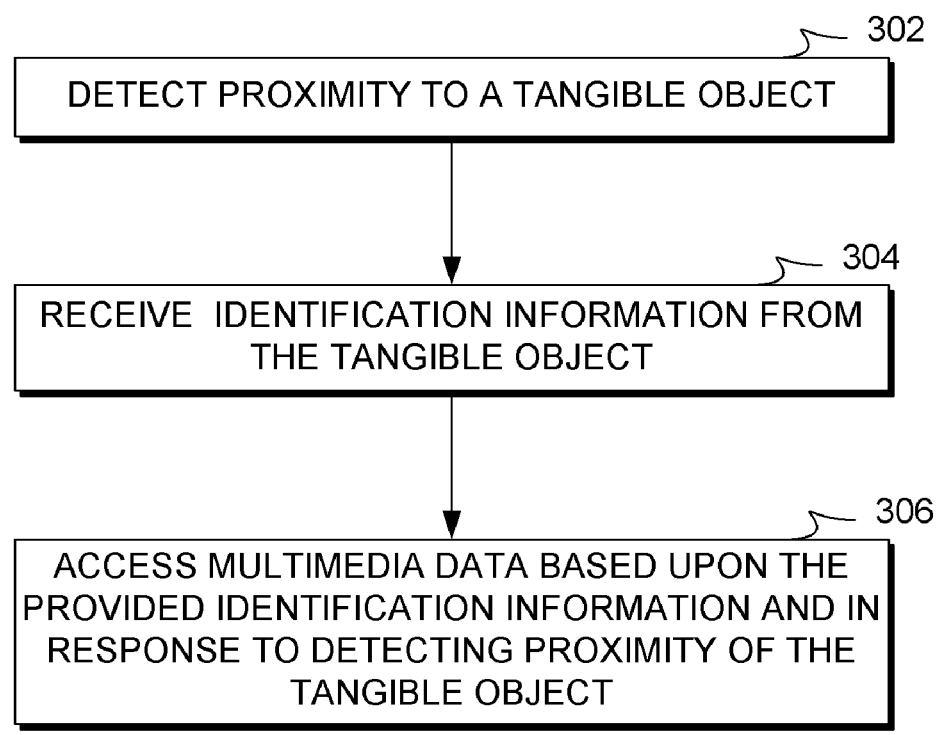
FIG. 3 is flowchart illustrating one example of a method of accessing multimedia data in a system such as illustrated in FIG. 1.
Figure 3:

FIG. 3 is a flowchart illustrating one example of a method 300 of accessing multimedia data during operation of the system 100. The method 300 begins at a block 302 in which the reader 104 detects proximity to a particular tangible object 102. Next at a block 304, the reader 104 receives identification information of the tangible object 102. Moving to a block 306, the access device 106 accesses multimedia data based upon the provided identification information and in response to detecting proximity of the tangible object 102. In one embodiment, the access device 106 identifies multimedia data associated with the identification information and accesses, or configures the playback device 108 to access and play, the identified multimedia information. Further details of various embodiments of the method 300 are discussed above with reference to FIGS. 1 and 2.

Figure 4:
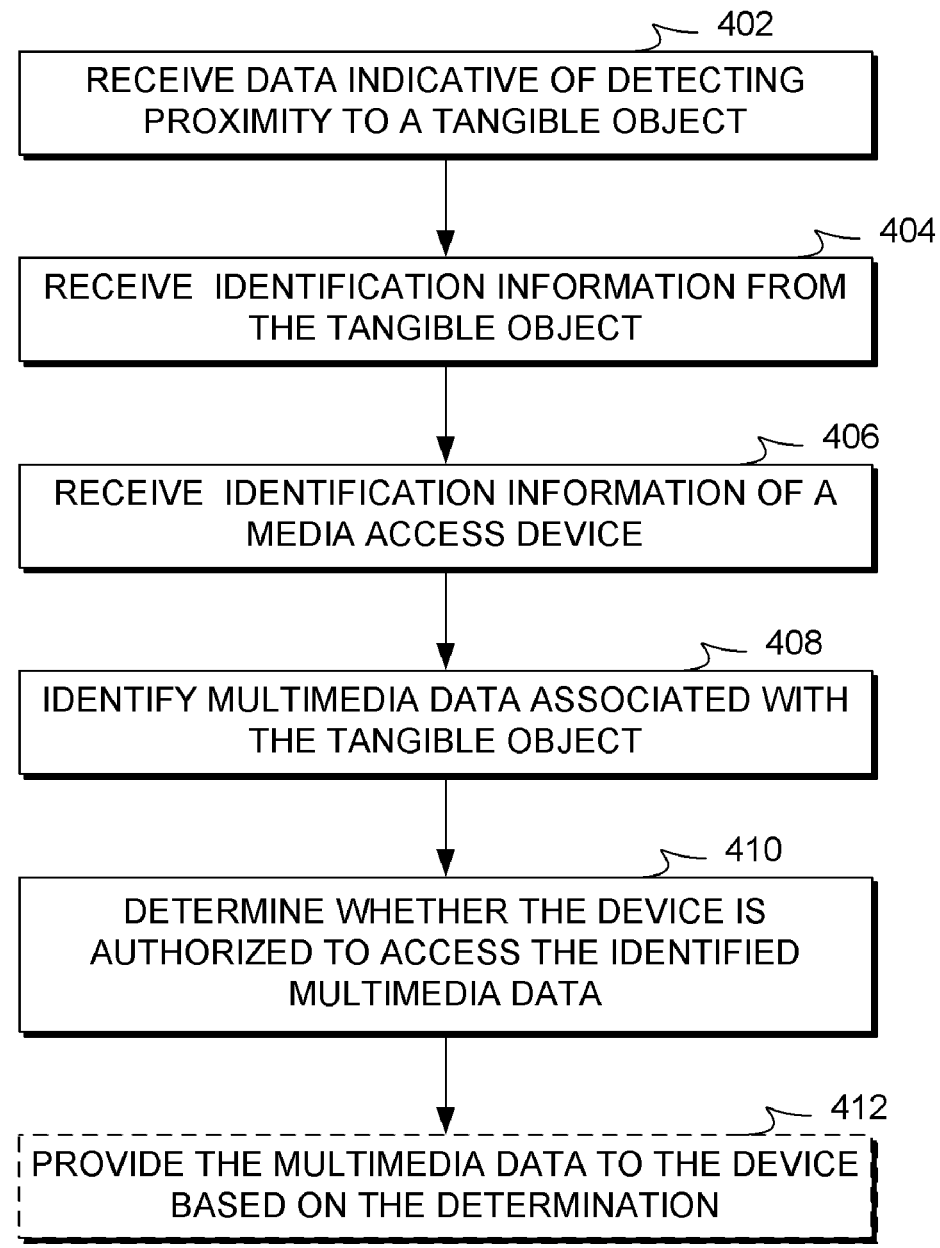
FIG. 4 is a flowchart illustrating one example of a method of providing multimedia data in a system such as illustrated in FIG. 1.

FIG. 4 is a flowchart illustrating one example of a method 400 of providing multimedia data in the system 100. The method 400 begins at a block 402 in which the media server 124 receives data indicative of detecting proximity to a particular tangible object 102, e.g., by the reader 104. Next at a block 404, the media server 124 receives identification information of the tangible object 102, e.g., from the reader 104. Moving to a block 406, the media server 124 receives identification information of a particular access device 106. Proceeding to a block 408, the media server 124 identifies multimedia content or data associated with the tangible object 102 based on the received identification information.

Moving to a block 410, with media server 124 determines whether the access device 106 is authorized to access the identified multimedia data. In one embodiment, any access device 106 is authorized. In another embodiment, a specified number of access devices 106, e.g., devices 106 registered to a particular user, is authorized. In another embodiment, a specified number of access devices 106 is authorized to access the multimedia data within a specified time period. Next at an optional block 412, the media server 124 provides the multimedia data to the access device 106 based on the determination. In one embodiment, the access device 106 stores or accesses the multimedia content without the media server 124 providing the data. Further details of various embodiments of the method 400 are discussed above with reference to FIGS. 1 and 2.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for accessing multimedia data, comprising:
   a tangible object comprising at least one proximity device embedded within the tangible object, wherein the tangible object is configured to provide identification information of the tangible object and wherein the identification information is associated with a set of multimedia content;
   a reader configured to wirelessly detect the tangible object based upon the proximity device and receive the multimedia content-associated identification information; and
   a device configured to receive a signal from the reader in response to detecting the tangible object and configured to access a source of multimedia data including the set of multimedia content based upon the provided multimedia content-associated identification information.

2. The system of claim 1, the tangible object comprising a housing having the proximity device embedded within.

3. The system of claim 2, wherein the housing has human readable information applied thereto that is indicative of the multimedia data.

4. The system of claim 1, wherein the tangible object comprises at least one of an electromagnetic resonant coupling device, a radio frequency identifier device, and a Bluetooth transceiver that is configured to provide the identification information of the tangible object.

5. The system of claim 1, wherein the device is configured to download the multimedia data in response to receiving the signal from the reader and wherein the download is performed without first processing user identification or account information.

6. The system of claim 1, wherein the reader is configured to identify a relative position of the tangible object with respect to the reader.

7. The system of claim 6, wherein the reader is configured to access the multimedia data based at least partly on the position.

8. The system of claim 7, wherein the tangible object has at least two sides and wherein access to the multimedia data is based at least partly on which of the sides is positioned closer to the reader.

9. The system of claim 1, wherein the reader is configured to identify an orientation of the tangible object with respect to the reader.

10. The system of claim 9, wherein the device is configured to access the multimedia data based at least partly on the orientation.

11. The system of claim 9, wherein the device is configured to activate a display to display the played multimedia data in response to the detecting the tangible object.

12. The system of claim 1, wherein the device comprises a video playback device configured to play the multimedia data in response to receiving the signal from the reader.

13. The system of claim 1, wherein the reader is configured to generate a second signal in response to removal of the tangible object from the proximity of the reader and wherein the device is configured to stop accessing the multimedia data in response to receiving the second signal.

14. The system of claim 1, wherein the reader comprises at least one of an electromagnetic resonant coupling device, a radio frequency identifier device reader, and a Bluetooth transceiver.

15. The system of claim 1, wherein the reader is further configured to receive at least one signal from the tangible object for controlling access to the multimedia data.

16. The system of claim 15, wherein the tangible object is configured to communicate said at least one signal based on detecting a user interaction with at least a portion of the object.

17. The system of claim 16, wherein the tangible object forms at least one of a toy or a doll.

18. The system of claim 1, wherein the device comprises a media access device.

19. The system of claim 1, wherein the device comprises a display device.

20. The system of claim 1, wherein the device comprises a set-top box.

21. The system of claim 1, wherein the multimedia data comprises at least one of a motion picture, an audio recording, and at least one photograph.

22. A method of accessing multimedia data using a processor, comprising:
   detecting proximity to a tangible object;
   receiving identification information of the tangible object; and
   accessing multimedia data based upon the provided identification information and in response to detecting proximity of the tangible object, wherein the multimedia data is associated with the tangible object via the provided identification information and wherein the accessing comprises accessing with the provided identification information, a database associating identification information for each of a plurality of objects with particular multimedia data.

23. The method of claim 22, wherein receiving the identification information comprises receiving a signal from at least one of an electromagnetic resonant coupling device, a radio frequency identifier device, and a Bluetooth transceiver that is configured to provide the identification information of the tangible object.

24. The method of claim 22, further comprising:
downloading the multimedia data in response to detecting the tangible object and operating a playback device to play the downloaded multimedia data based in part on orientation or position of the tangible object.

25. The method of claim 22, further comprising:
receiving a relative position of the tangible object with respect to a reader; and
accessing the multimedia data based at least partly on the position.

26. The method of claim 23, wherein the tangible object has at least two sides and wherein access to the multimedia data is based at least partly on which of the sides is positioned closer to the reader.

27. The method of claim 22, further comprising:
receiving an orientation of the tangible object with respect to a reader; and
accessing the multimedia data based at least partly on the orientation.

28. The method of claim 22, further comprising:
activating a display to display the played multimedia data in response to detecting the tangible object.

29. The method of claim 22, further comprising:
detecting removal of the tangible object from the proximity and
stopping access to the multimedia data in response to detecting removal.

30. The method of claim 22, further comprising:
receiving at least one signal from the tangible object for controlling access to the multimedia data.

31. The method of claim 30, wherein receiving the said at least one signal is based on detecting a user interaction with at least a portion of the tangible object.

32. A method of accessing multimedia data using a processor, the method comprising:
detecting proximity to a tangible object;
receiving identification information from the tangible object;
receiving identification information of a media access device;
identifying multimedia data associated with the identification information of the tangible object;
determining whether the device is authorized to receive the identified multimedia data;
and providing the multimedia data to the device based on the determining.

33. A method of claim 32, further comprising:
associating the identification information of the tangible object with the multimedia data; and
providing the tangible object.

34. A method of claim 32, wherein determining whether the device is authorized comprises determining whether the device is associated with the tangible object.

35. A method of claim 34, wherein determining whether the device is authorized further comprises:
determining whether the tangible object is associated with fewer than a specified number of media access devices; and,
identifying the tangible object with the device based on the determining.

36. A system for controlling access to multimedia data, comprising:
at least one data store configured to store data associating identification information of a tangible object with information indicative of multimedia content, wherein the store is further configured to store data associating the tangible object with at least one media access device; and
a processor configured to:
receive data indicative of detecting proximity to a tangible object;
receive identification information from the tangible object;
receive identification information of a media access device;
identify multimedia data associated with the of the tangible object;
determine whether the device is authorized to receive the identified multimedia data; and
provide the multimedia data to the device based on the determination.

37. A system of claim 36, wherein determining whether the device is authorized comprises determining whether the device is associated with the tangible object.

38. A system of claim 36, wherein determining whether the device is authorized further comprises:
determining whether the tangible object is associated with fewer than a specified number of media access devices; and
identifying the tangible object with the device based on the determining.

* * * * *